US008056867B2

(12) United States Patent
Tan Chin Yaw et al.

(10) Patent No.: US 8,056,867 B2
(45) Date of Patent: Nov. 15, 2011

(54) POSITION ASSURANCE ASSEMBLY FOR AN ELECTRICAL CONNECTOR

(75) Inventors: Tommy Tan Chin Yaw, Singapore (SG); Chui Seng Ng, Singapore (SG); Hua Sheng Soh, Singapore (SG)

(73) Assignee: J.S.T. Corporation, Farmington Hills, MI (US)

( * ) Notice: Subject to any disclaimer, the term of this patent is extended or adjusted under 35 U.S.C. 154(b) by 275 days.

(21) Appl. No.: 12/415,175

(22) Filed: Mar. 31, 2009

(65) Prior Publication Data

US 2010/0243835 A1 Sep. 30, 2010

(51) Int. Cl.
*F16L 3/00* (2006.01)

(52) U.S. Cl. ........................................... 248/51; 248/49

(58) Field of Classification Search .................... 248/51, 248/49; 439/676, 638, 205, 125 R
See application file for complete search history.

(56) References Cited

U.S. PATENT DOCUMENTS 3,668,324 A * 6/1972 Firestone ...................... 439/653
4,071,696 A * 1/1978 Anderson ..................... 439/372
4,411,485 A * 10/1983 Wiseheart et al. ............ 439/343
4,428,641 A * 1/1984 Flachbarth et al. ........... 439/572
5,229,545 A * 7/1993 Good ............................ 174/542
5,391,095 A * 2/1995 Born ............................ 439/676
5,664,900 A * 9/1997 Matthies ....................... 403/297
5,794,897 A * 8/1998 Jobin et al. ................... 248/74.4
6,053,780 A 4/2000 Ono et al.
6,575,784 B1 6/2003 Yamada
6,739,888 B2 5/2004 Kato et al.
6,941,483 B2 * 9/2005 Brown et al. ................ 713/500
7,048,586 B2 5/2006 Ishizaki et al.
7,165,995 B2 1/2007 Fukushima et al.
7,484,698 B2 * 2/2009 Budagher .................... 248/68.1

* cited by examiner

*Primary Examiner* — Amy J Sterling
(74) *Attorney, Agent, or Firm* — Rader, Fishman & Grauer PLLC

(57) ABSTRACT

A position assurance assembly includes an elongated fastener, a cover forming a cavity, a first position assurance part, a mounting surface, a second position assurance part and a fastener receptacle. The cover has a hole formed therethrough and is in communication with the cavity. The hole is sized to receive the fastener. The first position assurance part is connected to the cover and disposed inside of the cavity. The second position assurance part and the fastener receptacle are connected to and project from the mounting surface. Upon covering the second position assurance part and the fastener receptacle with the cover, the first position assurance part and the second position assurance part matably engage one another and, with the hole and the fastener receptacle in at least substantial registration with one another, the fastener extends through the hole and into the fastener receptacle for releasable engagement therewith.

18 Claims, 8 Drawing Sheets

POSITION ASSURANCE ASSEMBLY FOR AN ELECTRICAL CONNECTOR

FIELD OF THE INVENTION

The present invention relates to a position assurance assembly. More particularly, the present invention is directed to a position assurance assembly for an electrical connector.

BACKGROUND OF THE INVENTION

Prior art electrical connectors abound. For example, U.S. Pat. No. 6,053,780 to Ono et al. describes a fusible link mounting method in which a fusible link is mounted onto a fusible link housing. A leg portion of the fusible link and a terminal of an electric wire are tightened and connected to each other by a bolt. The bolt is provisionally tightened with respect to the fusible link housing. The terminal having a bridge portion formed so as to be able to pass outside a head portion of the bolt slides in a direction at right angles to a bolt tightening direction to thereby position a connecting portion of the terminal between the head portion of the bolt and the leg portion of the fusible link. The bolt is tightened to thereby connect the leg portion of the fusible link and the connecting portion of the terminal to each other.

In U.S. Pat. No. 7,165,995 to Fukushima et al., an electromagnetic interference shielded connector includes a plurality of electric wires, a connector housing and a metallic shielding shell. The plurality of electric wires has connecting parts at ends of the electric wires. The connector housing contains the electric wires and the connecting parts. The metallic shielding shell includes an electric-wire drawn-out portion through which the electric wires are drawn out and a terminal drawn-out portion from which the connecting parts are protruded and a shell ring which is attached to an outer circumferential surface of the electric-wire drawn-out portion to secure a braid to the shielding shell.

In U.S. Pat. No. 7,048,586 to Ishizaki et al, a plurality of shielding terminals is made of an electrically-conductive material. Each shielding terminal includes a plate-shaped conducting plate portion and a shielding shell of a tubular shape which is formed in an upstanding manner on the conducting plate portion and is electrically connected to an electrically-conductive shielding member of a corresponding shielded wire. The conducting plate portions of the shielding terminals are held between a holder plate and an outer surface of a connector housing and are disposed on the outer surface of the connector housing. These conducting plate portions are fixed to the connector housing by bolts and the conducting plate portions are held in surface-to-surface contact with the outer surface of the connector housing.

However, the above examples of the prior art electrical connectors are not particularly suitable for high-current or high-voltage applications. Also, none of the above examples of the prior art electrical connectors has position assurance assemblies associated with them to assure accurate alignment of the male and female terminal upon matable engagement.

SUMMARY OF THE INVENTION

A position assurance assembly of the present invention adapted for use with an electrical connector is hereinafter described. The position assurance assembly includes an elongated fastener, a cover, a first position assurance part, a mounting surface, a second position assurance part and a fastener receptacle. The cover has a base cover wall and a peripheral cover wall connected to and extending about the base cover wall to form an opening into a cavity. The base cover wall has a hole formed therethrough and is in communication with the cavity. The hole is sized to receive the fastener.

The first position assurance part is connected to the cover and is disposed inside of the cavity. The second position assurance part is connected to and projects from the mounting surface. The fastener receptacle is connected to and projects from the mounting surface. Upon covering the second position assurance part and the fastener receptacle with the cover, the first position assurance part and the second position assurance part matably engage one another and, with the hole and the fastener receptacle in at least substantial registration with one another, the fastener extends through the hole and into the fastener receptacle for releasable engagement therewith. Thus, the cover and the mounting surface are releasably secured to each other.

Another embodiment of the position assurance assembly for an electrical connector includes the features mentioned above as well as a connector block member. The connector block member is sized and adapted to be received and retained in the cavity and the connector block member has a connector block hole that is sized to receive the fastener. Upon covering the second position assurance part and the fastener receptacle with the cover, the first position assurance part and the second position assurance part matably engage one another and, with the base cover wall hole, the connector block hole and the fastener receptacle in at least substantial registration with one another, the fastener extends through the base cover wall hole and the connector block hole and into the fastener receptacle for releasable engagement therewith. Thus, the cover and the mounting surface are releasably secured to each other.

These objects and other advantages of the present invention will be better appreciated in view of the detailed description of the exemplary embodiments of the present invention with reference to the accompanying drawings, in which:

DETAILED DESCRIPTION OF THE EXEMPLARY EMBODIMENTS

Figure 1:
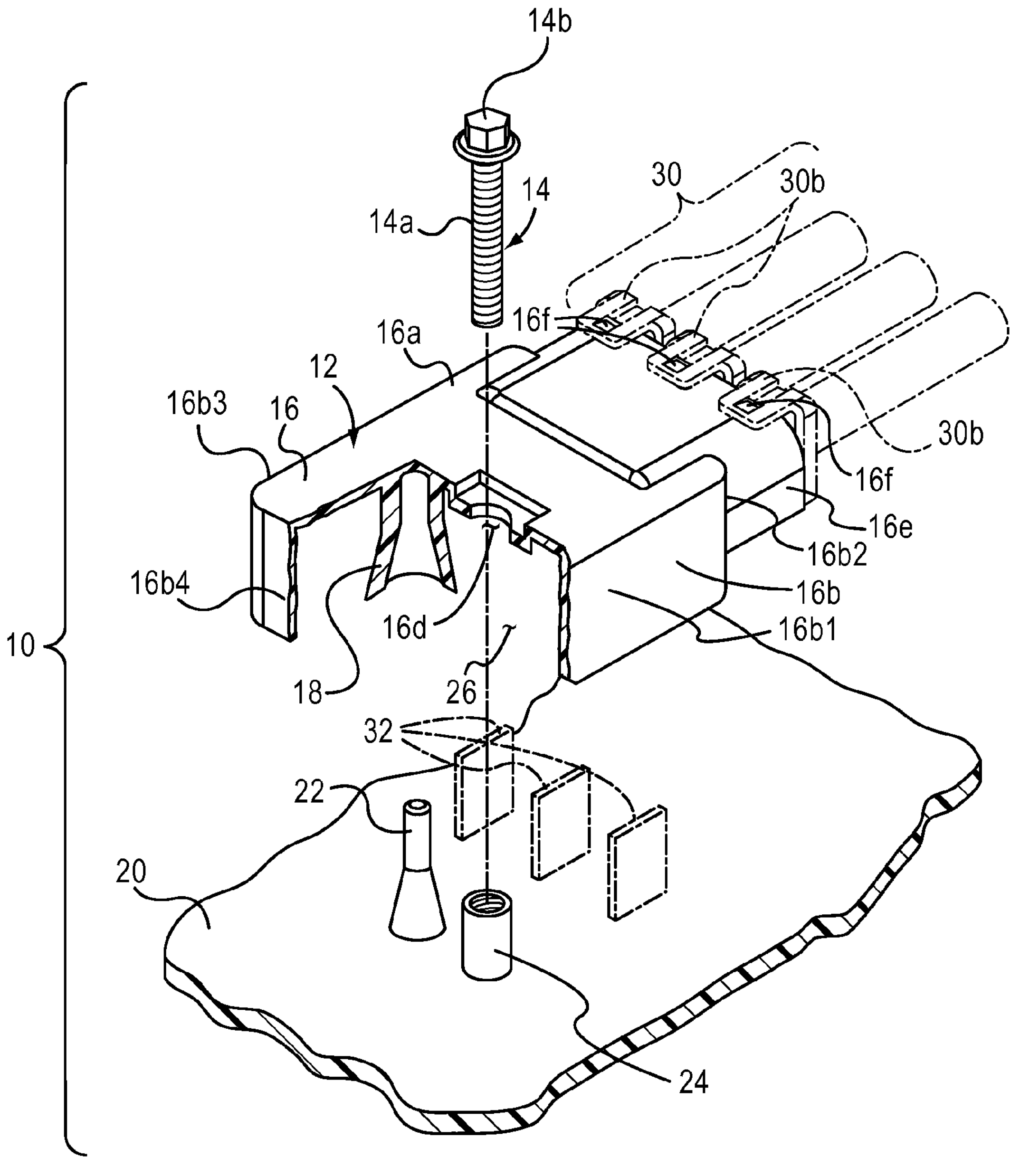
FIG. 1 is a perspective view partially broken away of the first exemplary embodiment of a position assurance assembly of the present invention.

Hereinafter, embodiments of the present invention will be described with reference to the attached drawings. The structural components common to those of the prior art and the structural components common to respective embodiments of the present invention will be represented by the same reference numbers and repeated description thereof will be omitted.

A first exemplary embodiment of a position assurance assembly 10 of the present invention that is adapted for use with an electrical connector 12 is hereinafter described with reference to FIGS. 1-6. As shown in FIGS. 1-6, the position assurance assembly 10 includes an elongated fastener 14, a cover 16, a first position assurance part 18, a mounting surface 20, a second position assurance part 22 and a fastener receptacle 24. By way of example only, the fastener 14 is a conventional bolt, such as a M6 bolt, that has a threaded body 14*a* and a head 14*b* connected to one end of the threaded body 14*a*.

Figure 2:
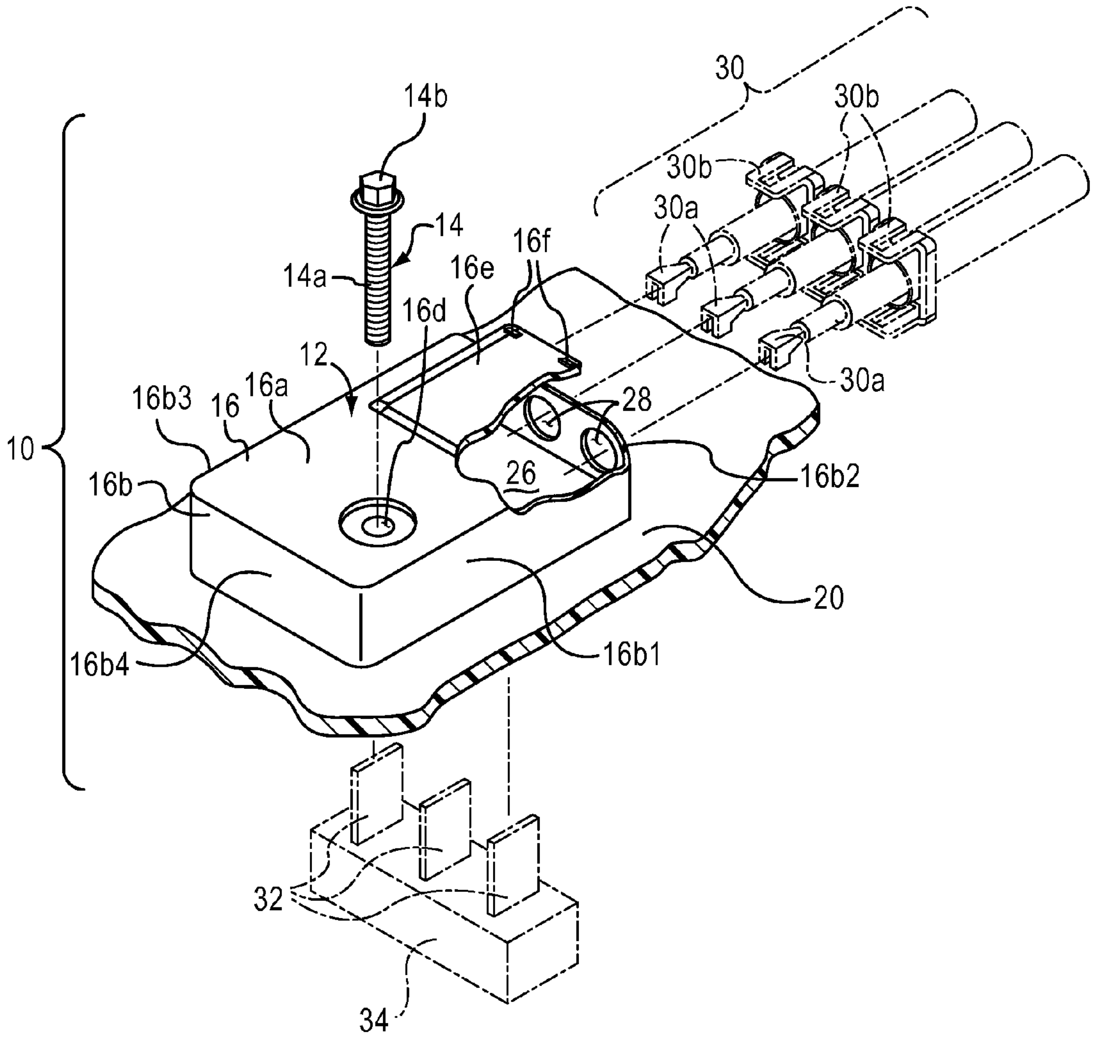
FIG. 2 is a perspective view of the position assurance assembly connected to a mounting surface.

As shown in FIGS. 1 and 2, the cover 16 has a base cover wall 16*a* and a peripheral cover wall 16*b* that is connected to and extends about the base cover wall 16*a* to form an opening 16*c* into a cavity 26. For the first exemplary embodiment of the position assurance assembly 10 and by way of example only, the cover 16 is fabricated from an electrically-conductive metal material. The base cover wall 16*a* has a base cover wall hole 16*d* that is formed therethrough and is in communication with the cavity 26. The base cover wall hole 16*d* is sized to slidably receive the fastener 14.

As shown in FIGS. 1 and 3-6, the first position assurance part 18 is connected to the cover 16 and is disposed inside of the cavity 26. For the first exemplary embodiment of the position assurance assembly 10, the first position assurance part 18 is connected to the base cover wall 16*a* inside of the cavity 26. The second position assurance part 22 is connected to and projects from the mounting surface 20. The fastener receptacle is connected to and projects from the mounting surface 20.

Figure 4:
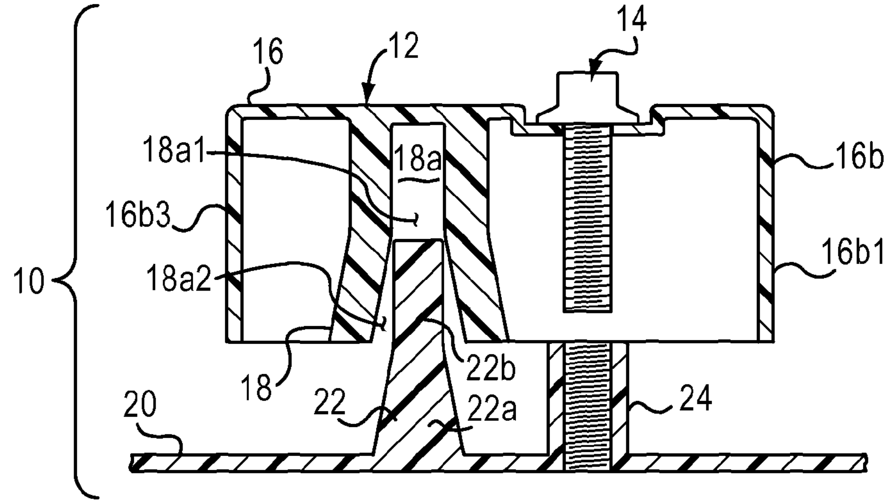
FIG. 4 is a side elevation view of the position assurance assembly illustrating an aligned the cover and the mounting surface with the locator pin being further engaged with the locator pin receptacle.
Figure 5:
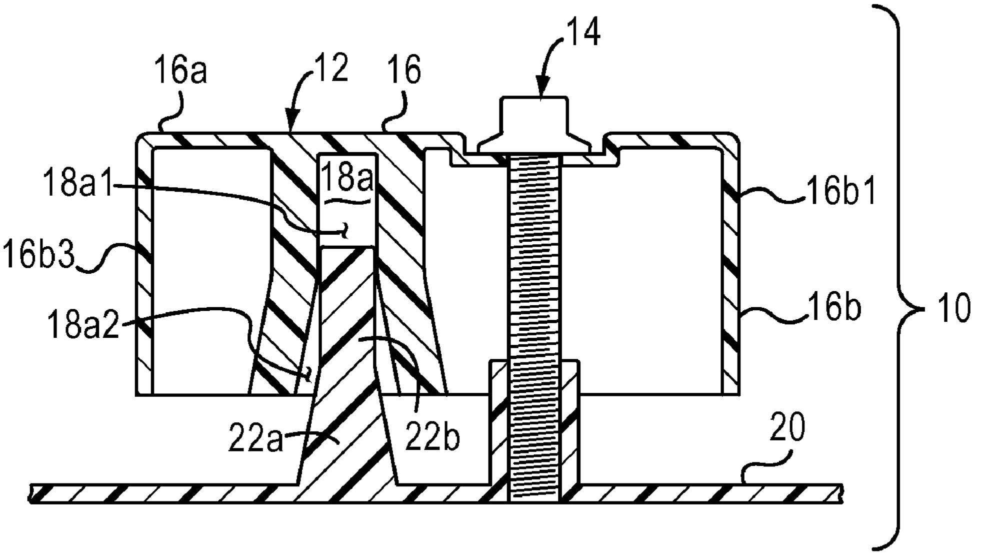
FIG. 5 is a side elevation view of the position assurance assembly illustrating the aligned cover and the mounting surface with the locator pin being even further engaged with the locator pin receptacle.
Figure 6:
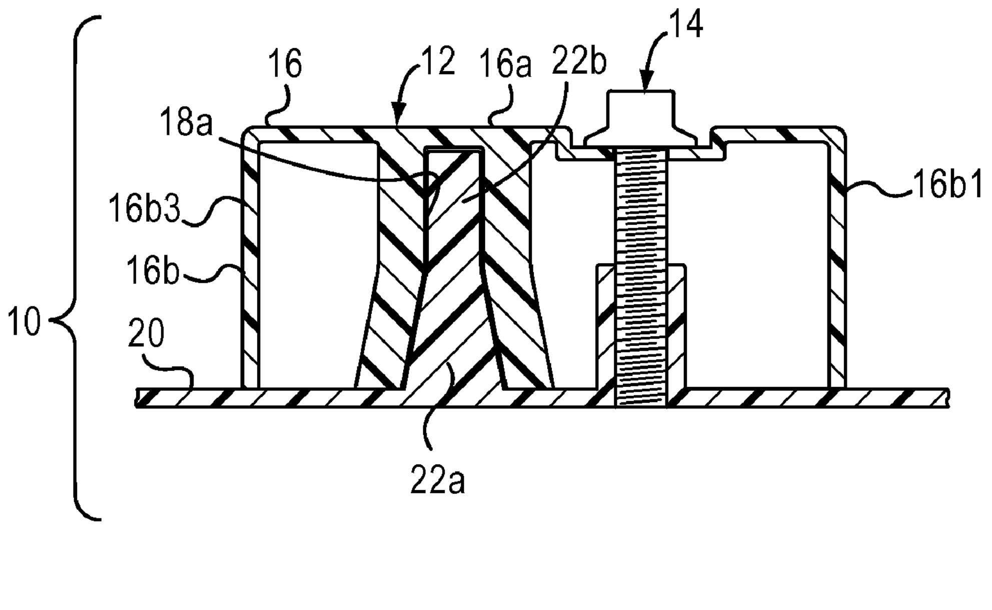
FIG. 6 is a side elevation view of the position assurance assembly illustrating the aligned cover and the mounting surface with the locator pin being fully engaged with the locator pin receptacle and a fastener and a fastener receptacle being releasably engaged with each other thereby securing the cover and the mounting surface together.

As shown in sequence from FIG. 1 to FIG. 2 and from FIG. 3 to FIG. 6, upon covering the second position assurance part 22 and the fastener receptacle 24 with the cover 16, the first position assurance part 18 and the second position assurance part 22 matably engage one another (FIGS. 3-6) and, with the base cover wall hole 16*d* and the fastener receptacle 24 in at least substantial registration with one another (FIGS. 4-6), the fastener 14 extends through the base cover wall hole 16*d* and into the fastener receptacle 24 (FIG. 6). A skilled artisan would appreciate that the fastener 14 and the fastener receptacle 24 are releasably engaged with one another thereby releasably securing the cover 16 to the mounting surface 20.

Figure 3:
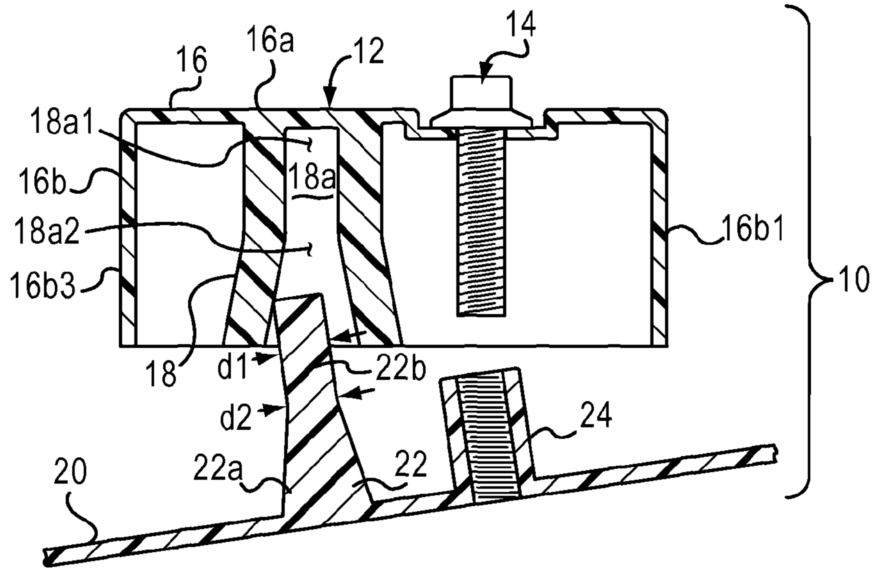
FIG. 3 is a side elevation view of the position assurance assembly illustrating a misaligned cover and a mounting surface initially being aligned with one another with a locator pin being partially engaged with a locator pin receptacle.

By way of example only and not by way of limitation, the first position assurance part 18 is a locator pin receptacle and the second position assurance part 22 is a locator pin as that shown in FIGS. 3-6. The locator pin, i.e. the second position assurance part 22, has a conical frustum locator pin portion 22*a* and a cylindrical locator pin portion 22*b* that is connected to the conical frustum locator pin portion 22*a*. The locator pin receptacle, i.e. the first position assurance part 18, has a locator pin hole 18*a* sized to initially slidably receive the cylinder locator pin portion 22*b* of the locator pin 22 and thereafter to slidably receive conical frustum locator pin portion 22*a*. (See, in sequence, FIGS. 3-6). As illustrated in FIGS. 3-5, the locator pin hole 18*a* has a conical frustum locator pin hole portion 18*a*1 and a cylindrical locator pin hole portion 18*a*2 that is in communication with the conical frustum locator pin hole portion 18*a*1. In this manner, the locator pin hole 18*a* is sized such that the locator pin receptacle 18 and the locator pin 22, when the locator pin 22 is received by the locator pin hole 18*a*, are in a close-fitting relationship with each other as best illustrated in FIG. 6. With this arrangement illustrated in FIG. 6, the locator pin 22 cancels any torque applied to the cover 16 when it is secured to the mounting surface 20. Furthermore, as best illustrated in FIG. 3, the locator pin 22 and the locator pin receptacle 18 act as a position assurance device as a skilled artisan would appreciate.

Again, with reference to FIGS. 3-6, the conical frustum locator pin portion 22*a* tapers towards the cylindrical locator pin portion 22*b*. The conical frustum locator pin portion 22*a* and the cylindrical locator pin portion 22*b* are formed as an integral construction at an interface. At the interface, a diameter d1 of cylindrical locator pin portion 22*b* shown in FIG. 3 and diameter d2 of conical frustum locator pin portion 22*a* are at least substantially identical.

In FIGS. 1 and 2, the peripheral cover wall 16*b* has four peripheral cover wall sections 16*b*1-16*b*4. The four peripheral cover wall sections 16*b*1-16*b*4 are serially connected to each other to form a rectangular configuration as suggested in FIGS. 1 and 2. A selected one of the four peripheral cover wall sections 16*b*1-16*b*4, namely peripheral cover wall section 16*b*2 shown in FIG. 2, has a plurality of wire-assembly receiving holes 28 formed therethrough. The wire-assembly receiving holes 28 receive respective ones of a plurality of wire assemblies 30 as is commonly known in the art. The wire assemblies 30 are secured inside the cavity 26 in a manner known in the art and as suggested in FIG. 1. Once the wire assemblies 30 are secured inside the cavity 26, blade-receiving terminals 30*a* of each one of the plurality of wire assemblies 30 are positioned in the cavity to receive respective ones of a plurality of hot blade terminals 32 from a power source 34 as reflected in FIGS. 1 and 2.

By way of example only and not by way of limitation, the cover 16 also has a wire-assembly conduit 16*e* that surrounds the wire-assembly receiving holes 28 as shown in FIGS. 1 and 2. A plurality of lock projections 16*f* are formed on the wire-assembly conduit 16*e* that engage respective ones of a plurality of latches 30*a* of the wire assemblies 30.

Figure 7:
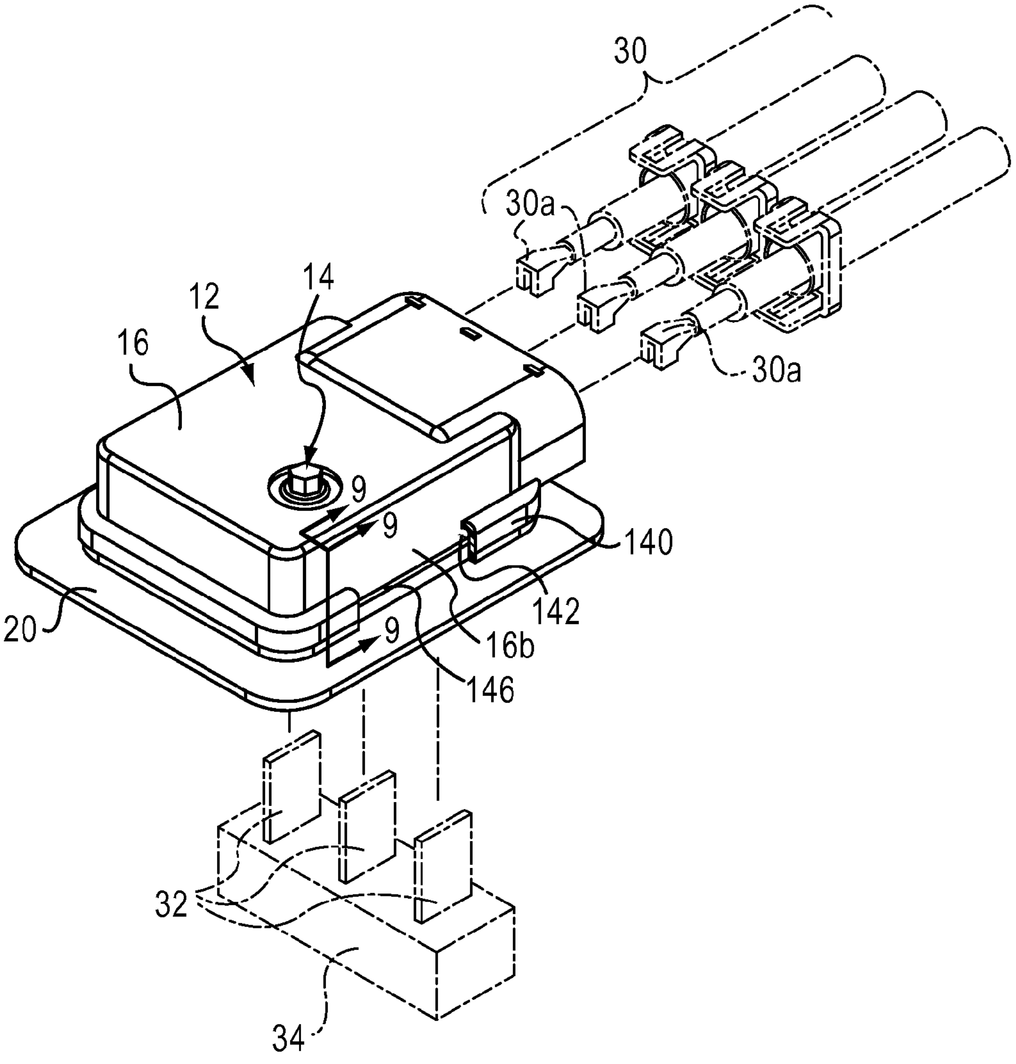
FIG. 7 is a perspective view partially broken away of a second exemplary embodiment of a position assurance assembly of the present invention secured to the mounting surface.
Figure 8:
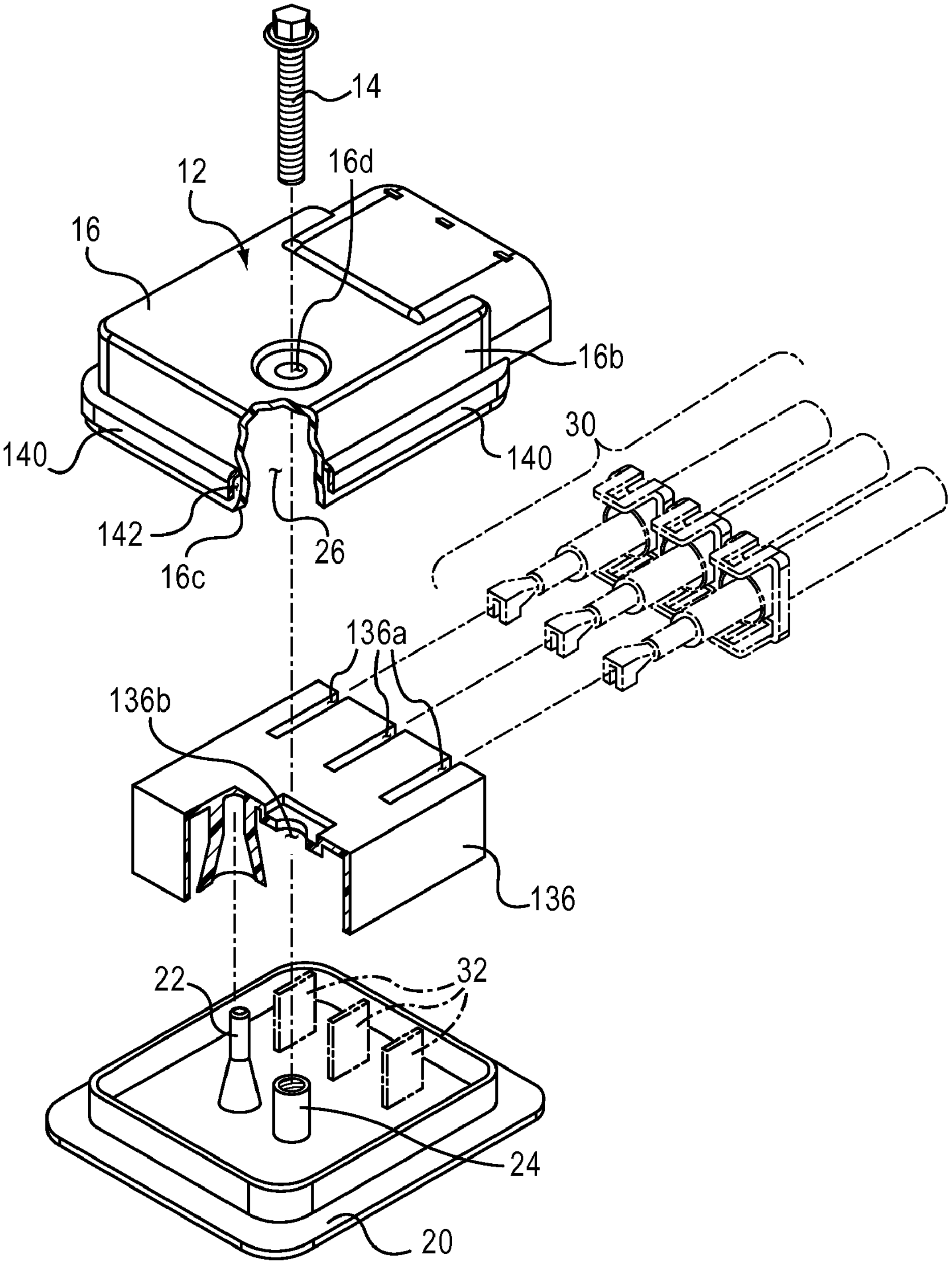
FIG. 8 is an exploded perspective view of the position assurance assembly shown in FIG. 7.
Figure 9:
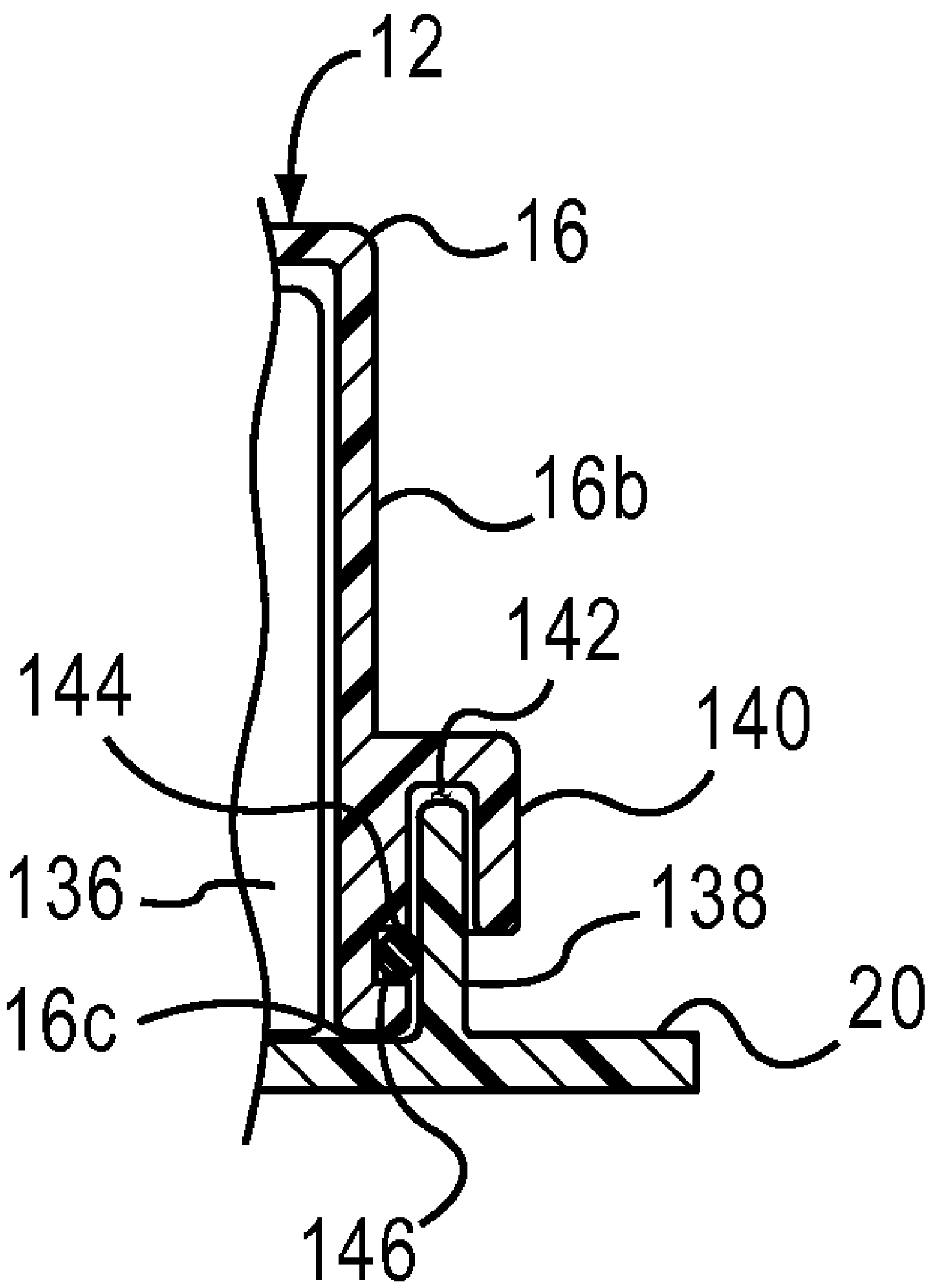
FIG. 9 is a partial elevational view of the position assurance assembly of the present invention taken along the line 9-9-9 in FIG. 7.

A second exemplary embodiment of a position assurance assembly 110 of the present invention is introduced in FIGS. 7-9. The second exemplary embodiment of the position assurance assembly 110 is generally similar to the first exemplary embodiment of the position of assurance assembly 10 described above. However, one difference is that the second exemplary embodiment of the position assurance assembly 110 includes a connector block member 136. The connector block member 136 is sized and adapted to be received and retained in the cavity 26. The connector block member 136 can be retained in the cavity 26 by mechanical fasteners such as screws, by being force-fit into the cavity 26, by an adhesive or by any conventional means. As shown in FIG. 8, the connector block member 136 includes terminal passageways 136*a* that receive the respective ones of the blade-receiving terminals 30*a* as is commonly known in the art. Also, in FIG. 8, the connector block member 136 has a connector block hole 136*b* extending therethrough and sized to receive the fastener 14. With this arrangement of the second exemplary embodiment of the position assurance assembly 110, the first position assurance part 18, illustrated as the locator pin receptacle, is formed as a component of the connector block member 136. In general terms, the first position assurance part 18 is associated with the connector block member 136 which, in turn, is disposed inside of the cavity 26.

Also, for the second exemplary embodiment of the position assurance assembly 110, a barrier wall 138 is connected to and projects from the mounting surface 20 as best shown in FIG. 8. The barrier wall 138 surrounds the second position assurance part 22 and the fastener receptacle 24. Further, as illustrated in FIGS. 7-9, the cover 16 includes a skirt member 140. The skirt member 140 is connected to and extends circumferentially about the peripheral cover wall 16*b* adjacent the opening 16*c*. As best shown in FIG. 9, the skirt member 140 extends outwardly from the peripheral cover wall 16*b* and towards the opening 16*c* to form a circumferential channel 142. Again, with reference to FIG. 9, the circumferential channel 14 is sized to receive at least a part of the barrier wall 138.

Additionally, as best illustrated in FIG. 9, the peripheral cover wall 16*b* has a circumferential groove formed into it that extends completely around the peripheral cover wall 16. The circumferential groove 144 is sized to receive an O-ring 146. Thus, with this arrangement of the second exemplary embodiment of the position assurance assembly 110 of the present invention, when the cover 16 and the mounting surface 20 are releasably secured to each other, the cavity 26 is sealed.

As shown in FIGS. 7 and 8, the mounting surface 20 is shown as an individual and separate component. A skilled artisan would appreciate that that this mounting surface 20 can attach to a workpiece surface such as, for example only, a firewall inside an engine compartment of a vehicle. As shown in FIGS. 1 and 2 by way of example only, the mounting surface 20 is illustrated as the workpiece surface itself.

Figure 10:
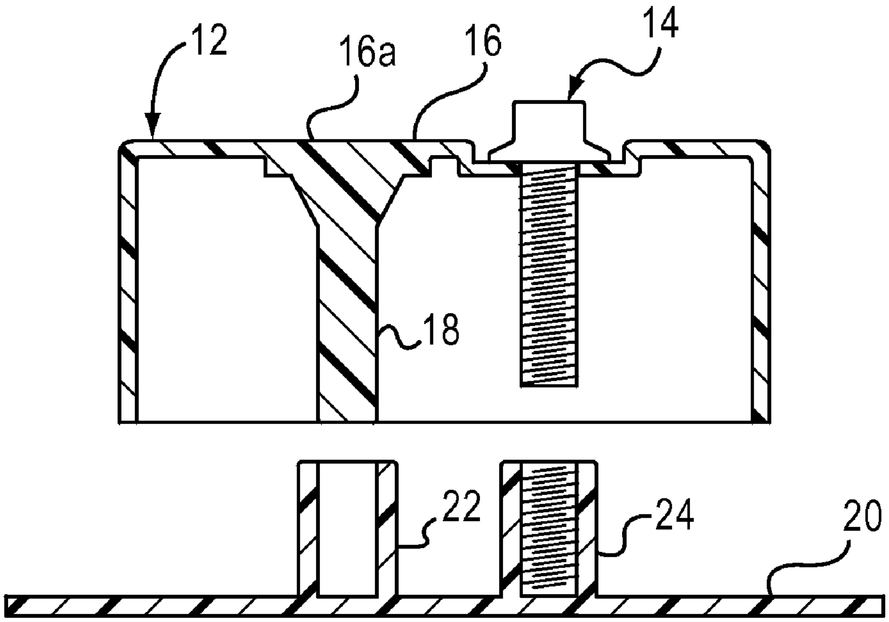
FIG. 10 is a side elevation view of a third exemplary embodiment of the position assurance assembly illustrating an aligned the cover and the mounting surface with the locator pin.
Figure 11:
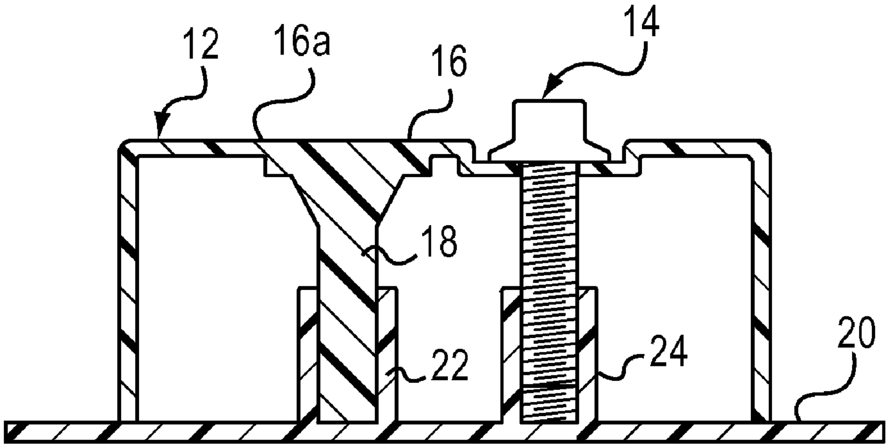
FIG. 11 is a side elevation view of the position assurance assembly illustrating the aligned cover and the mounting surface with the locator pin being fully engaged with the locator pin receptacle.

A third exemplary embodiment of the position assurance assembly 210 of the present invention is introduced in FIGS. 10 and 11. The third exemplary embodiment of the position assurance assembly 210 is similar to the first exemplary embodiment of the position assurance assembly 10. The difference is that the first position assurance part 18 in the form of the locator pin is attached to the base cover wall 16 a of the cover 16 while the second position assurance part 22 in the form of the locator pin receptacle is connected to the mounting surface 20. In brief, one of ordinary skill in the art would appreciate that the form of the first and second position assurance parts are interchangeable without departing from the spirit and concepts of the invention.

A skilled artisan would appreciate that the exemplary embodiments of the position assurance assembly for electrical connectors can be used for low or high current applications, for low or high voltage applications and for electrical connectors having blade-type terminals.

The present invention, may, however, be embodied in various different forms and should not be construed as limited to the exemplary embodiments set forth herein; rather, these exemplary embodiments are provided so that this disclosure will be thorough and complete and will fully convey the scope of the present invention to those skilled in the art.

What is claimed is:

1. A position assurance assembly for an electrical connector, comprising:

an elongated fastener;

a cover extending along and about a longitudinal axis in a lengthwise direction, a lateral axis in a widthwise direction and a transverse axis in a heightwise direction, the longitudinal axis, the lateral axis and the transverse axis perpendicularly intersecting one another at a centrally-located common point to form a conventional Cartesian coordinate system, the cover having a base cover wall and a peripheral cover wall connected to and extending about the base cover wall to form an opening into a cavity, the base cover wall having a hole formed therethrough and in communication with the cavity, the hole sized to receive the fastener, the peripheral cover wall having a forward wall, a rearward wall and a pair of side walls with respective ones of the pair of side walls connected to and between the forward and rearward walls, the rearward wall extending parallel to the forward wall and disposed apart from the forward wall in the lengthwise direction, the pair of side walls extending parallel to and disposed apart from one another in the widthwise direction;

a first position assurance part connected to the cover and disposed inside of the cavity;

a mounting surface;

a second position assurance part connected to and projecting from the mounting surface; and a fastener receptacle connected to and projecting from the mounting surface, wherein, the hole and the first position assurance part are disposed apart from and aligned with one another in the widthwise direction, straddle the longitudinal axis and are positioned forward of the lateral and transverse axes in the lengthwise direction and thus closer to the forward wall than the rearward wall and upon covering the second position assurance part and the fastener receptacle with the cover, the first position assurance part and the second position assurance part matably engage one another and, with the hole and the fastener receptacle in at least substantial registration with one another, the fastener extends through the hole and into the fastener receptacle for releasable engagement therewith thereby releasably securing the cover to the mounting surface.

2. A position assurance assembly according to claim 1, wherein one of the first position assurance part and the second position assurance part is a locator pin and a remaining one of the first position assurance part and the second position assurance part is a locator pin receptacle sized to slidably receive the one of the first position assurance part and the second position assurance part.

3. A position assurance assembly according to claim 2, wherein the locator pin has a conical frustum locator pin portion and a cylindrical locator pin portion connected to the conical frustum locator pin portion.

4. A position assurance assembly according to claim 3, wherein the locator pin receptacle has a locator pin hole sized to first slidably receive the cylinder locator pin portion and thereafter slidably receive conical frustum portion.

5. A position assurance assembly according to claim 4, wherein the locator pin hole is sized such that the locator pin receptacle and the locator pin, when received by the locator pin hole, are in a close-fitting relationship with each other.

6. A position assurance assembly according to claim 3, wherein the conical frustum locator pin portion tapers towards the cylindrical locator pin portion.

7. A position assurance assembly according to claim 1, wherein the peripheral cover wall has four peripheral cover wall sections serially connected to each other to form a rectangular configuration, a selected one of the four peripheral coverall wall sections has a plurality of wire-assembly receiving holes formed therethrough.

8. A position assurance assembly according to claim 7, further comprising a barrier wall connected to and projecting from the mounting surface and surrounding the second position assurance part and the fastener receptacle.

9. A position assurance assembly according to claim 8, wherein the cover includes a skirt member connected to and extending circumferentially about the peripheral cover wall adjacent the opening, the skirt member extending outwardly from the peripheral cover wall and towards the opening to form a circumferential channel sized to receive, at least in part, the barrier wall.

10. A position assurance assembly according to claim 9, further comprising an O-ring and wherein the peripheral cover wall has a circumferential groove formed therearound, the circumferential groove sized to receive the O-ring.

11. A position assurance assembly according to claim 10, wherein the circumferential groove is disposed between the skirt member and the opening.

12. A position assurance assembly for an electrical connector, comprising:

an elongated fastener;

a cover extending along and about a longitudinal axis in a lengthwise direction, a lateral axis in a widthwise direction and a transverse axis in a heightwise direction, the longitudinal axis, the lateral axis and the transverse axis perpendicularly intersecting one another at a centrally-located common point to form a conventional Cartesian coordinate system, the cover having a base cover wall and a peripheral cover wall connected to and extending about the base cover wall to form a cavity, the base cover wall having a hole formed therethrough and in communication with the cavity, the hole sized to receive the fastener, the peripheral cover wall having a forward wall, a rearward wall and a pair of side walls with respective ones of the pair of side walls connected to and between the forward and rearward walls, the rearward wall extending parallel to the forward wall and disposed apart from the forward wall in the lengthwise direction, the pair of side walls extending parallel to and disposed apart from one another in the widthwise direction;

a first position assurance part connected to the base cover wall inside of the cavity;

a mounting surface;

a second position assurance part connected to and projecting from the mounting surface; and a fastener receptacle connected to and projecting from the mounting surface, wherein, the hole and the first position assurance part are disposed apart from and aligned with one another in the widthwise direction, straddle the longitudinal axis and are positioned forward of the lateral and transverse axes in the lengthwise direction and thus closer to the forward wall than the rearward wall and upon covering the second position assurance part and the fastener receptacle with the cover, the first position assurance part and the second position assurance part matably engage one another and, with the hole and the fastener receptacle in at least substantial registration with one another, the fastener extends through the hole and into the fastener receptacle for releasable engagement therewith thereby releasably securing the cover to the mounting surface.

13. A position assurance assembly according to claim 12, wherein one of the first position assurance part and the second position assurance part is a locator pin and a remaining one of the first position assurance part and the second position assurance part is a locator pin receptacle sized to slidably receive the one of the first position assurance part and the second position assurance part.

14. A position assurance assembly according to claim 13, wherein the locator pin has a conical frustum locator pin portion and a cylindrical locator pin portion connected to the conical frustum locator pin portion, the locator pin receptacle having a locator pin hole sized to first slidably receive the cylinder locator pin portion and thereafter slidably receive conical frustum portion.

15. A position assurance assembly according to claim 12, wherein the peripheral cover wall has four peripheral cover wall sections serially connected to each other to form a rectangular configuration, a selected one of the four peripheral coverall wall sections has a plurality of wire-assembly receiving holes formed therethrough.

16. A position assurance assembly according to claim 15, further comprising a barrier wall connected to and projecting from the mounting surface and surrounding the second position assurance part and the fastener receptacle.

17. A position assurance assembly according to claim 16, wherein the cover includes a skirt member connected to and extending circumferentially about the peripheral cover wall adjacent the opening, the skirt member extending outwardly from the peripheral cover wall and towards the opening to form a circumferential channel sized to receive, at least in part, the barrier wall.

18. A position assurance assembly according to claim 17, further comprising an O-ring and wherein the peripheral cover wall has a circumferential groove formed therearound, the circumferential groove sized to receive the O-ring, the circumferential groove being disposed between the skirt member and the opening.

* * * * *